United States Patent [19]

Takada et al.

[11] 4,320,724
[45] Mar. 23, 1982

[54] INTER-CRANKCHAMBER SEALING MEANS FOR MULTIPLE CYLINDER TWO STROKE ENGINES

[75] Inventors: Toshiyuki Takada, Miki; Shinichi Tamba, Kakogawa; Hitoshi Yamamoto, Hyogo, all of Japan

[73] Assignee: Kawasaki Jukogyo Kabushiki Kaisha, Japan

[21] Appl. No.: 140,008

[22] Filed: Apr. 14, 1980

[30] Foreign Application Priority Data

Apr. 16, 1979 [JP] Japan .................................. 54-46993

[51] Int. Cl.³ .......................... F02B 33/04; F01M 1/00
[52] U.S. Cl. .......................... 123/73 AD; 123/196 R; 308/187; 184/6.5
[58] Field of Search ...................... 123/196 R, 73 AD; 184/6.5; 308/187

[56] References Cited

U.S. PATENT DOCUMENTS 3,514,943  2/1970  Britt .................................... 308/187
3,913,992  10/1975  Scott et al. ......................... 308/187

Primary Examiner—Charles J. Myhre
Assistant Examiner—E. Rollins Cross
Attorney, Agent, or Firm—Kerkam, Stowell, Kondracki & Clarke

[57] ABSTRACT

A non-contact type seal between two adjacent crankchambers of a multiple cylinder two stroke engines includes a sealing member fitted to the crankcase to encircle the crankshaft or the sleeve fitted to the crankshaft with a slight clearance between the sealing member and the crankshaft or the sleeve. A lubricant oil passage is formed in the sealing member to open to the clearance between the sealing member and the crankshaft or the sleeve so that the clearance is filled with lubricant oil which is to be supplied to the bearings at the opposite sides of the sealing member. The seal between the two crankchambers is provided by the lubricant oil in the clearance.

5 Claims, 4 Drawing Figures

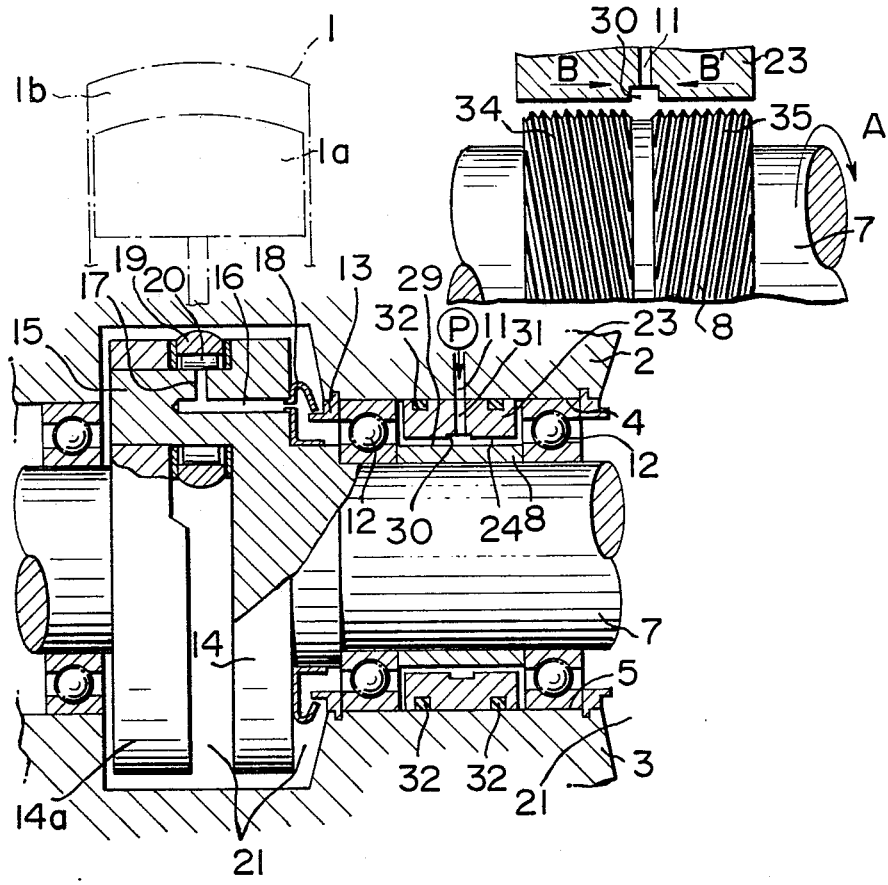
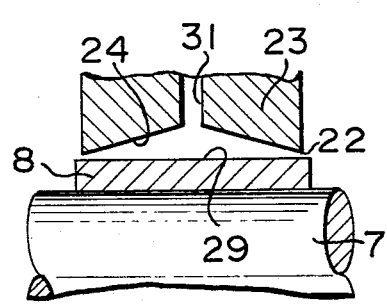
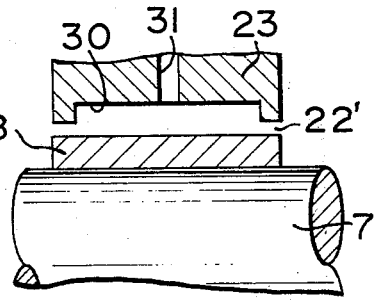

INTER-CRANKCHAMBER SEALING MEANS FOR MULTIPLE CYLINDER TWO STROKE ENGINES

DESCRIPTION

The present invention relates to crankchamber precompression type multiple cylinder two stroke engines and more particularly to inter-cylinder seal means for such two stroke engines.

In crankchamber precompression type two stroke engines, combustible air-fuel mixture is introduced into the crankchamber in an upward or ascending stroke of the piston and then compressed and forced into the combustion chamber through scavenging passages in a downward or descending stroke of the piston. In multiple cylinder engines of crankcase precompression type, it is therefore necessary to provide seal means around the crankshaft between adjacent two crankchambers. Coventionally, such seal means is comprised of an annular sealing member secured to the crankcase of the engine to encircle the portion of the crankshaft between the two crankchambers. The portion of the crankshaft may be fitted with a sleeve of which outer cylindrical surface opposes to the inner surface of the sealing member. The sealing member is formed at the radially inward surface with labyrinth grooves to provide a seal between the member and the crankshaft. In order to provide paths of lubricant oil to crankshaft bearings which are disposed at the opposite sides of the annular sealing member, the sealing member is further formed with axially extending oil passages which are in communication with a radially extending oil supply passage also formed in the sealing member.

In the above arrangement, however, difficulties have been encountered in forming the labyrinth grooves. Since the grooves are of small widths, it takes time in forming such grooves and the grooving work causes a rapid wear of tools. Further, in order to ensure a sealing effect by the labyrinth grooves, it is required to maintain a strictly controlled fine gap in the order of 0.1 mm between the crankshaft and the inner surface of the sealing member. Even if a sleeve member is provided on the crankshaft for cooperation with the sealing member, precise machining works must be effected on the sealing member and the sleeve member. It should further be noted that even when such precise machining is performed, an adequate sealing will not be accomplished unless a sufficient axial length is maintained, whereby a substantial distance must be provided between two adjacent cylinders.

In order to avoid the above and other disadvantages inherent to a labyrinth sealing mechanism, a contact type sealing mechanism may be employed. However, such a solution will provide further problems in that the portion where the sealing mechanism is located is of a relatively high temperature so that a special heat resistant material must be used for the sealing member. Further, the sealing member may be worn through a prolonged use and the sealing effect may be destroyed. A further problem of the contact type seal is that there will be a mechanical loss due to the sliding contact between the sealing member and the rotating part such as the crankshaft.

It is therefore an object of the present invention to provide sealing means between two adjacent crankchambers of multiple cylinder, crankchamber precompression type two stroke engines which does not have any sliding contact between stationary and moving parts but does not require precise machining as in the conventional arrangement.

Another object of the present invention is to provide sealing means between two adjacent crankchambers in which sealing effect is provided through utilization of viscosity, surface tension and inertia of lubricant oil.

According to the present invention, the above and other objects can be accomplished by a multiple cylinder two stroke engines comprising at least two crankchambers which is defined by crankcase means and in which intake gas is introduced and compressed so as to be forced into combustion chambers, rotatable shaft means extending between the crankchambers and supported by bearing means on the crankcase means, sealing means encircling said rotatable shaft means with a clearance therebetween, said sealing means being formed with liquid passage means leading from liquid supply source and opening to said clearance between the sealing means and the rotatable shaft means to thereby provide a supply of lubricant oil through said clearance to said bearing means. Preferably, the sealing means is in the form of a cylindrical sealing member having a radially inward surface wherein the passage means is opened through at least one opening, and circumferential groove means is provided in said inner surface of the sealing member to contain said opening. The rotatable shaft means, which may be a crankshaft or a sleeve member fitted to the crankshaft, may preferably be formed with screw threaded portions at the axially opposite sides of the liquid passage means, said screw threaded portions having screw threads of which directions of helix are such that liquid in the clearance between the sealing means and the rotatable shaft means is forced under the influence of the screw threads towards the liquid passage means as the rotatable shaft means rotates.

The above and other objects and features of the present invention will become apparent from the following descriptions of preferred embodiments taking reference to the accompanying drawings, in which;

FIG. 1 is a fragmentary sectional view of the crank mechanism of a two stroke engines embodying the feature of the present invention;

FIGS. 2 (*a*) and (*b*) show sealing arrangements in accordance with other embodiments of the present invention; and, FIG. 3 is a fragmentary sectional view of the sealing mechanism in accordance with a further embodiment of the present invention.

Referring now to the drawings, particularly to FIG. 1, there is shown a part of a crankcase precompression type two stroke engines having cylinders 1 in which pistons 1*a* are disposed for reciprocating movements and to define combustion chambers 1*b* in the cylinders 1. Beneath the cylinders 1, there is a crankcase comprised of a crankcase upper 2 and a crankcase lower 3 which together define crankchambers 21. A crankshaft 7 extends between the crankchambers 21 and rotatably supported on the crankcase by a pair of axially spaced bearings 12. More specifically, the crankcase upper 2 and the crankcase lower 3 are respectively formed with semi-cylindrical surfaces 4 and 5 which together define a cylindrical surface to which the outer races of the bearings 12 are fitted. The inner races of the bearings 12 are in turn fitted to the crankshaft 7.

The crankshaft 7 is integrally formed at each end with a crankweb 14 which is disposed in each crankchamber 21 and has a crankpin 15 fitted to another crankweb 14a which is also disposed in the crankchamber 21. Between the crankwebs 14 and 14a, the crankpin 15 carries one end of a connecting rod 19 through a bearing 20, the other end of the connecting rod 19 being connected with the piston 1a.

Between the bearings 12, the crankshaft 7 has a sleeve 8 which is fitted thereto and has a cylindrical outer surface 29. On the crankcase, there is a sealing member 23 which is fitted to the cylindrical surface defined by the surfaces 4 and 5 with interventions of O-rings 32. The sealing member 23 has a cylindrical inner surface 24 which is opposed to the cylindrical outer surface 29 of the sleeve 8 with a slight clearance therebetween. The crankcase is formed with an oil supply passage 11 which is communicated with a radial oil passage 31 formed in the sealing member 23. The passage 31 opens to the cylindrical inner surface 24 of the sealing member 23 and an annular groove 30 is formed in the inner surface 24 at the position of the passage 31. It should therefore be noted that lubricant oil is supplied from the passage 11 in the crankcase through the passage 31 in the sealing member 23 to the groove 30 and then through the clearance between the sleeve 8 and the sealing member 23 to the bearings 12.

In order to lead the lubricant oil from each bearing 12 to the bearing 20 on the crankpin 15, the crankcase carries an annular oil slinger 13 so that the oil is directed from the bearing 12 to the crankweb 14. The crankweb 14 is formed with an axial oil passage 16 and a radial oil passage 17 which opens to the bearing 20. An oil receiver 18 is provided on the crankweb 14 to direct the oil from the bearing 12 to the passage 16.

In operation of the engine, the lubricant oil from the oil pump P is supplied to the passage 11 is circulated as described previously. Since the clearance between the sleeve 8 and the sealing member 23 is thus filled with oil, the adjacent crankchambers 21 can be separated from each other. The seal between the crankchambers 21 is more reliable that a labyrinth type seal although the former does not require precise machining as in the latter. The clearance between the sleeve 8 and the sealing member 23 may be larger than the clearance in a labyrinth type seal.

In order to provide a uniform distribution of lubricant oil between the pair of bearings 12, the sealing member 23 should preferably be symmetrical with respect to a radial plane containing the center of the groove 30. The sleeve 8 and the sealing member 23 may be made of a sintered material or a dicast material. Where the surfaces 24 and 29 of the members 23 and 8 are to be machined, the opposite end portions of each member should preferably be machined while rotating the member in opposite directions.

FIGS. 2(a) and (b) show alternative modifications of the embodiment shown in FIG. 1. In FIG. 2(a), the inner surface 24 of the sealing member 23 is not cylindrical but tapered from the center toward the opposite axial ends of the sealing member 23 to provide throat portions 22. In FIG. 2(b), the groove 30 on the inner surface of the sealing member 23 is axially widened so that throat portions 22' are provided at the axially opposite ends of the sealing member 23. These modifications are advantageous in that the sealing property is less sensitive to the machining precision than in the previous embodiment.

Referring now to FIG. 3, it will be noted that the sleeve 8 on the crankshaft 7 is formed at the outer surface with threaded portions 34 and 35. The threaded portion 34 is formed at one axial side of the groove 30 and has screw threads of which direction of helix is such that the lubricant oil between the sleeve 8 and the sealing member 23 is forced under the influence of the screw threads toward the groove 30 as shown by an arrow B upon rotation of the crankshaft 7 in the direction of an arrow A. The threaded portion 34 is formed at the opposite side with respect to the groove 30 and has screw threads which are of oppositely directed helix so as to force the oil toward the groove 30 as shown by an arrow B'. In this arrangement, since the lubricant oil is forced under the influence of the screw threads in the threaded portions 34 and 35 toward the groove 30, there is less possibility of the gas in one crankchamber blown to the other crankchamber through the clearance between the sleeve 8 and the sealing member 23 because oil is always retained in the groove 30. The screw threads may be substituted by spiral indentations which may be formed through grinding operations. Further, the screw threaded portions or indentations may be formed on the inner surface of the sealing member 23. In the embodiments shown in FIGS. 1 and 3, the groove 30 is formed in the sealing member 23, however, in an alternative embodiment, it may be formed in the rotatable member. The groove 30 may not necessarily be supplied with lubricant oil but may be supplied with a mixture of lubricant oil and gasoline.

The invention has thus been shown and described with reference to specific embodiments, however, it should be noted that the invention is in no way limited to the details of the illustrated arrangements but changes and modifications may be made without departing from the scope of the appended claims.

We claim:

1. Crankchamber precompression type multiple cylinder two stroke engines comprising at least two crankchambers which is defined by crankcase means and in which intake gas in introduced and compressed so as to be forced into combustion chambers, rotatable shaft means extending between the crankchambers and supported by bearing means on the crankcase means, sealing means encircling said rotatable shaft means with a clearance therebetween, said sealing means being formed with liquid passage means leading from liquid supply source and opening to said clearance between the sealing means and the rotatable shaft means to thereby provide a supply of lubricant oil through said clearance to said bearing means.

2. Engine in accordance with claim 1 in which the sealing means is in the form of a cylindrical sealing member having a radially inward surface wherein the passage means is opened through at least one opening, and circumferential groove means is provided in said inner surface of the sealing member to contain said opening.

3. Engine in accordance with claim 2 in which said circumferential groove is of a width occupying a substantial portion of axial length of the sealing member to provide throat portions between the sealing member and the rotatable shaft means at the opposite ends of the sealing member.

4. Engine in accordance with claim 1 in which said clearance is tapered from axial center portion to axial end portions thereof.

5. Engine in accordance with claim 1 in which said rotatable shaft means is formed with screw threaded portions at the axially opposite sides of the liquid passage means, said screw threaded portions having screw threads of which directions of helix are such that liquid in the clearance between the sealing means and the rotatable shaft means is forced under the influence of the screw threads towards the liquid passage means as the rotatable shaft means rotates.

* * * * *